(12) United States Patent
Koester (10) Patent No.: US 9,400,061 B2
(45) Date of Patent: Jul. 26, 2016

(54) FLUID VALVE APPARATUS HAVING ENCLOSED SEALS

(71) Applicant: Fisher Controls International LLC, Marshalltown, IA (US)

(72) Inventor: David John Koester, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 95 days.

(21) Appl. No.: 13/953,411

(22) Filed: Jul. 29, 2013

(65) Prior Publication Data

US 2015/0028242 A1    Jan. 29, 2015

(51) Int. Cl.
*F16K 25/00* (2006.01)
*F16K 5/04* (2006.01)
*F16K 1/226* (2006.01)

(52) U.S. Cl.
CPC ............. *F16K 25/005* (2013.01); *F16K 1/2261* (2013.01); *F16K 5/0457* (2013.01)

(58) Field of Classification Search
CPC ... F16K 25/005; F16K 1/2261; F16K 5/0457; F16K 1/226
USPC .................. 251/305, 306, 177, 180
See application file for complete search history.

(56) References Cited

U.S. PATENT DOCUMENTS

| | | | |
|---|---|---|---|
| 1,988,216 A | 1/1935 | Ryan | |
| 3,352,316 A | 11/1967 | Zahn | |
| 4,457,491 A * | 7/1984 | Dudman | F16K 5/0673 251/317 |
| 4,507,521 A | 3/1985 | Goellner | |
| 4,744,572 A | 5/1988 | Sahba et al. | |
| 5,149,055 A | 9/1992 | Huber et al. | |
| 6,250,604 B1 | 6/2001 | Robert | |
| 7,963,502 B2 | 6/2011 | Lovell et al. | |

(Continued)

FOREIGN PATENT DOCUMENTS

| | | |
|---|---|---|
| DE | 851153 | 10/1952 |
| EP | 0308390 | 3/1989 |

(Continued)

OTHER PUBLICATIONS

United States Patent and Trademark Office, "Non-Final Office Action," issued in connection with U.S. Appl. No. 14/208,389, mailed on Jun. 5, 2015, 18 pages.

(Continued)

*Primary Examiner* — Mary McManmon
*Assistant Examiner* — Nicole Wentlandt
(74) *Attorney, Agent, or Firm* — Hanley, Flight and Zimmerman, LLC (57) ABSTRACT

Fluid valve apparatus having enclosed seals are disclosed. An example fluid valve includes a movable flow control member positioned between an inlet and an outlet of a fluid flow passageway of the fluid valve. A retainer is removably coupled to the flow control member such that the retainer and the flow control member define a sealing cavity when the retainer is coupled to the flow control member. A seal is positioned within the sealing cavity to define a sealing surface of the flow control member. The seal has an inner core composed of a first material, where the core is substantially encased with a sheath composed of a second material different than the first material. The retainer clamps the seal to the flow control member.

26 Claims, 9 Drawing Sheets

(56) References Cited

U.S. PATENT DOCUMENTS

| | | |
|---|---|---|
| 2008/0047616 A1 | 2/2008 | Lovell et al. |
| 2010/0270491 A1 | 10/2010 | Faas |
| 2014/0264129 A1 | 9/2014 | Grabau |

FOREIGN PATENT DOCUMENTS

| | | | |
|---|---|---|---|
| EP | 0424360 | 4/1991 | |
| EP | 0675304 | 10/1995 | |
| GB | 110983 | 11/1917 | |
| GB | 278522 | 10/1927 | |
| GB | 344123 | 3/1931 | |
| GB | 1011186 A | * 11/1965 | ............ F16K 1/2261 |
| GB | 1130338 A | * 10/1968 | .............. F16K 1/226 |
| GB | 1413697 | 11/1975 | |
| JP | 2001349439 | 12/2001 | |
| JP | 2002039395 | 2/2002 | |
| WO | 2008036576 | 3/2008 | |
| WO | 2014151564 | 9/2014 | |

OTHER PUBLICATIONS

Patent Cooperation Treaty, "International Search Report," issued in connection with PCT Application No. PCT/US2014/026005, mailed on Jun. 27, 2014, 5 pages.

Fisher, "8560 Eccentric Disc Butterfly Control Valve", Instruction Manual D102013X012, Dec. 2010, 36 pages.

Fisher, "8580 Rotary Valve", Instruction Manual D103300X012, May 2011, 24 pages.

International Searching Authority, "International Search Report," issued in connection with International Patent Application No. PCT/US2014/048577, mailed on Oct. 16, 2014, 3 pages.

International Searching Authority, "Written Opinion of the International Searching Authority," issued in connection with International Patent Application No. PCT/US2014/048577, mailed on Oct. 16, 2014, 5 pages.

United States Patent and Trademark Office, "Final Office Action," issued in connection with U.S. Appl. No. 14/208,389, Jan. 14, 2016, 20 pages.

International Bureau, International Preliminary Report on Patentability, issued in connection with PCT patent application No. PCT/US2014/048577, Feb. 11, 2016, 7 pages.

* cited by examiner

FLUID VALVE APPARATUS HAVING ENCLOSED SEALS

FIELD OF THE DISCLOSURE

This disclosure relates generally to valves and, more particularly, to fluid valve apparatus having enclosed seals.

BACKGROUND

Control valves (e.g., sliding stem valves, rotary valves, axial flow valves, globe valves, etc.) are commonly used in industrial processes (e.g., oil and gas pipeline distribution systems and chemical processing plants) to control the flow of process fluids. To control fluid flow, a control valve often employs a flow control member (e.g., a plate, a disk, a plug, etc.) that moves relative to a valve seat positioned in a valve body of the control valve. For example, a control valve having a relatively tight shut-off capability provides shut-off control such that substantially no fluid flows through the control valve when the flow control member sealingly engages the valve seat. Fluid flow may be allowed and/or increased as the flow control member moves and/or rotates away from the valve seat.

Some known control valves employ a seal as part of the valve seat and/or the control flow member (e.g., along a peripheral edge of the flow control member) to effect and/or improve a seal between the flow control member and the valve seat. Typically, industrial process conditions, such as pressure conditions, operation temperatures, and the type of process fluids dictate the type of seals that may be used. For example, soft seals composed of elastomers (e.g., EPDM) or fluoropolymers (e.g., PTFE) allow the flow control member to engage the valve seat more tightly and, thus, provide improved sealing characteristics to help prevent or restrict fluid flow through the control valve (i.e., provide relatively tight shut-off or seal characteristics). However, soft seals composed of elastomers or fluoropolymers have lower temperature and/or erosion resistance characteristics compared to, for example, seals composed of metal. For example, some soft seals may become damaged when used with process fluids having temperatures greater than 600° F. and/or may erode when used with process fluids having significant fluid pressures or velocities. Thus, such known seals can be used in a limited temperature range and/or with flows having a limited pressure or velocity range.

Seals composed of metal, on the other hand, provide greater resistance to temperature and erosion compared to soft seals. While such known metal seals have greater resistance to high temperatures and erosion, such known metal seals provide inferior sealing capabilities compared to soft seals and, thus, metal seals may not meet desired shut-off capability and/or classification. In some applications, control valves employ a laminated seal composed of graphite and stainless steel. Although such known laminated graphite seals enable a relatively tight shut-off over a wide temperature range, portions of the graphite layers that remain exposed to the process fluids having relatively high pressures or velocities may be susceptible to erosion.

SUMMARY

An example fluid valve disclosed herein includes a movable flow control member positioned between an inlet and an outlet of a fluid flow passageway of the fluid valve. A retainer is removably coupled to the flow control member such that the retainer and the flow control member define a sealing cavity when the retainer is coupled to the flow control member. A seal is positioned within the sealing cavity to define a sealing surface of the flow control member. The seal has an inner core composed of a first material, where the core is substantially encased with a sheath composed of a second material different than the first material. The retainer clamps the seal to the flow control member.

Another example fluid valve includes a flow control member positioned within a fluid valve. The flow control member has a seal assembly to define a sealing surface about a peripheral edge of the flow control member. The seal assembly has a first seal portion composed of an expanded graphite material and a second seal portion composed of a metallic material, where the second seal portion substantially encases the first seal. The second seal is sufficiently thin relative to the first seal portion to allow the first seal portion to resiliently deform (e.g., elastically deform) to seal the second seal portion against a valve seat of the fluid valve. A retainer retains the seal assembly about the peripheral edge of the flow control member.

Another example valve includes means for controlling fluid flow between an inlet and an outlet of a fluid flow passageway defined by the fluid valve and means for sealing coupled to the means for controlling fluid flow. The means for sealing has a first portion composed of a first material and a second portion composed of a second material different than the first material, where the second seal portion substantially encloses the first seal portion. The valve includes means for seating to receive the means for sealing when the means for controlling moves to a closed position. The second seal portion is relatively thin compared to the first seal portion to enable the first seal portion resiliently to deform to cause the second seal portion to engage and conform to a shape of a means for seating to provide a relatively tight shut-off. The fluid valve includes means for retaining the means for sealing against the means for controlling fluid flow.

Certain examples are shown above in the identified figures and described below in detail. In describing these examples, like or identical reference numbers are used to identify the same or similar elements. The figures are not necessarily to scale. Certain features and views of the figures may be exaggerated in scale or may be in schematic form for clarity or conciseness. Additionally, several examples have been described throughout this specification. Any features from any example may replace, be included with, or otherwise combine with other features from other examples.

DETAILED DESCRIPTION

The example fluid valves disclosed herein employ movable flow control members having a sealing surface to sealingly engage a valve seat of the fluid valve. More specifically, the example flow control member may include a retainer removably coupled to a body to define a sealing cavity of the flow control member. A seal or seal assembly is positioned within the sealing cavity and may be clamped between the body of the flow control member and the retainer to define the sealing surface of the flow control member. In some examples, the example flow control members disclosed herein may employ a locking or breakout prevention feature, which prevents the seal or seal assembly from loosening or becoming dislodged from the sealing cavity when the flow control member moves to an open position under a relatively high pressure fluid flow. In some examples, the locking feature may be provided by a clamping plate or surface of the seal or seal assembly that is captured or pinched between a wall or surface of the retainer and a wall or surface of the body to provide an increased holding force when the retainer is coupled to the body. In some examples, the seal or seal assembly may include one or more shoulders that are positioned in channels or grooves formed in the retainer and/or the body of the flow control member to retain the seal or the seal assembly within a sealing cavity of the flow control member.

The example seal or seal assembly disclosed herein may include a first seal portion (e.g., a graphite seal) encased or wrapped (e.g., fully or partially) with a second seal portion (e.g., a protective sheath, film or strip of material). The second seal portion is a relatively thin layer of material compared to the first seal portion and protects the first seal portion from damage that may otherwise occur when the first seal portion is exposed to process fluids having relatively high temperatures and/or pressures or velocities.

The example second seal portion disclosed herein may be composed of metal or any other material that provides greater resistance to high temperatures and/or erosion than provided by the first seal portion. Additionally, while the second seal portion provides protection to the first seal portion, the second seal portion is relatively thin compared to the first seal portion so that the second seal portion can conform, bend, flex and/or otherwise seal against a sealing surface of a fluid device. As a result, the relatively thin second seal portion enables the first seal portion to resiliently deform to cause the second seal portion to seal against a sealing surface of a fluid valve to provide a shut-off that is substantially equivalent to a shut-off capability typically provided by the first seal portion. Thus, although the second seal portion surrounds a sealing surface of the first seal portion, the second seal portion does not degrade or affect the sealing capabilities of the first seal portion. In other words, even though the second seal portion is positioned between the first seal portion and the seating surface of the fluid valve, the seal assembly provides a sealing capability of the first seal portion. Thus, the example seal assembly disclosed herein may provide greater temperature and/or erosion resistance while providing a relatively tight shut-off capability (e.g., a shut-off capability otherwise provided by a first seal portion composed of expanded graphite material).

An example seal that may be incorporated with the example fluid valves disclosed herein is described in U.S. Pat. No. 4,457,491, which is incorporated herein by reference in its entirety.

Figure 1:
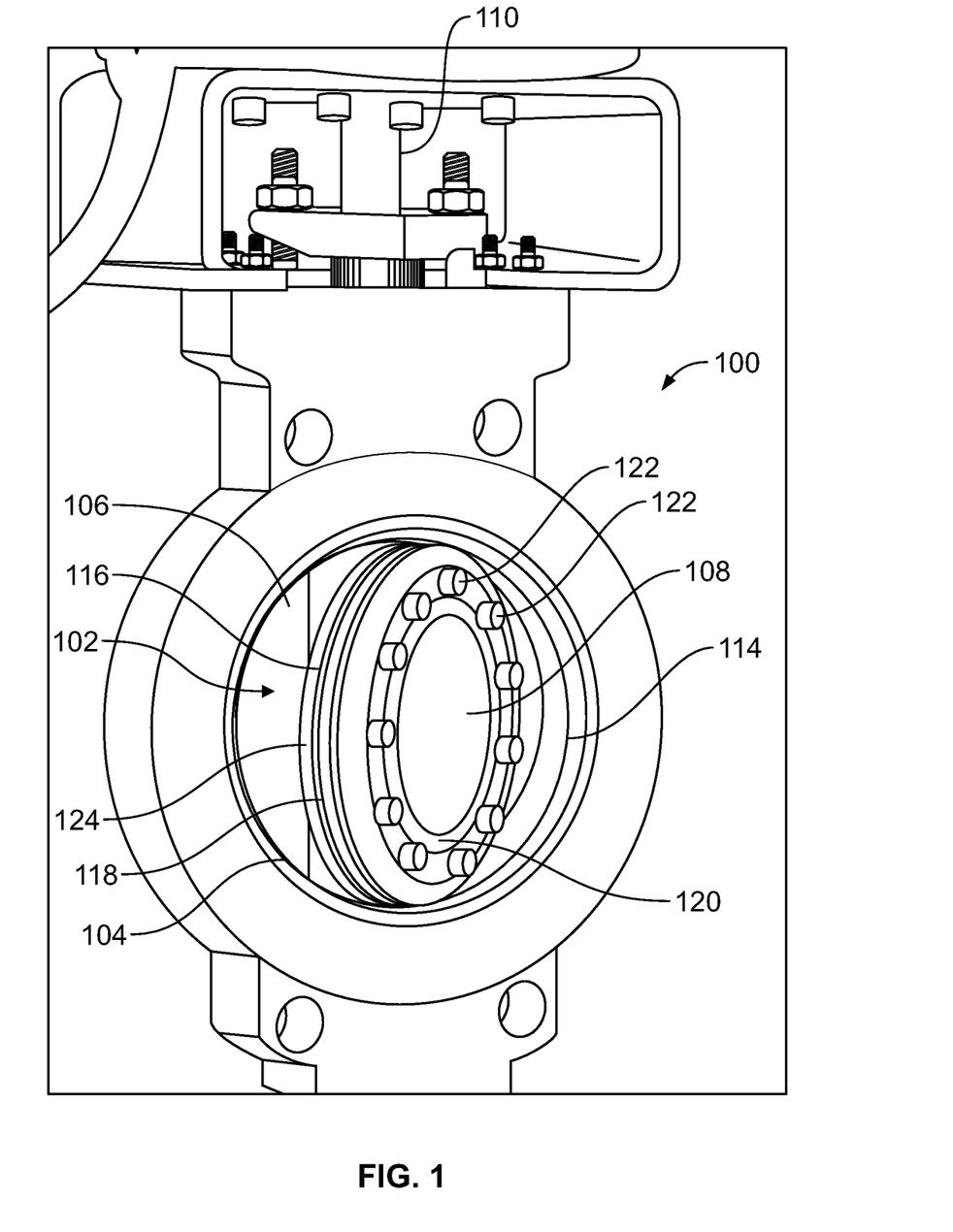
FIG. 1 illustrates a fluid valve constructed in accordance with the teachings disclosed herein.

FIG. 1 depicts a fluid or rotary valve 100 constructed in accordance with the teachings disclosed herein. The rotary valve 100 shown in FIG. 1 may, for example, be used to control process fluids, such as natural gas, oil, water, etc. over a wide range of temperatures and/or fluid pressures. As shown in FIG. 1, the rotary valve 100 defines a fluid flow passageway 102 between an inlet 104 and an outlet 106 and a movable flow control member 108 (e.g., a disk) is interposed in the fluid flow passageway 102 to control fluid flow through the fluid flow passageway 102. More specifically, the flow control member 108 is operatively coupled to an actuator (not shown) (e.g., a manual actuator, a pneumatic actuator, etc.) via a valve shaft 110 that causes the flow control member 108 to move (e.g., rotate, turn, etc.) relative to a seating surface 114 (e.g., a seat ring) of the fluid flow passageway 102 between an open position and a closed position.

When the flow control member 108 is in the closed position, a sealing surface 116 of the flow control member 108 engages the seating surface 114 (e.g., a seat ring) of the rotary valve 100 to prevent or restrict fluid flow through the fluid flow passageway 102. The sealing surface 116 of the illustrated example is defined by a seal or seal assembly 118. The flow control member 108 of the illustrated example includes a retainer 120 removably coupled to a body 124 of the flow control member 108 via a plurality of fasteners 122 to retain or clamp the seal 118 to the body 124.

Figure 2:
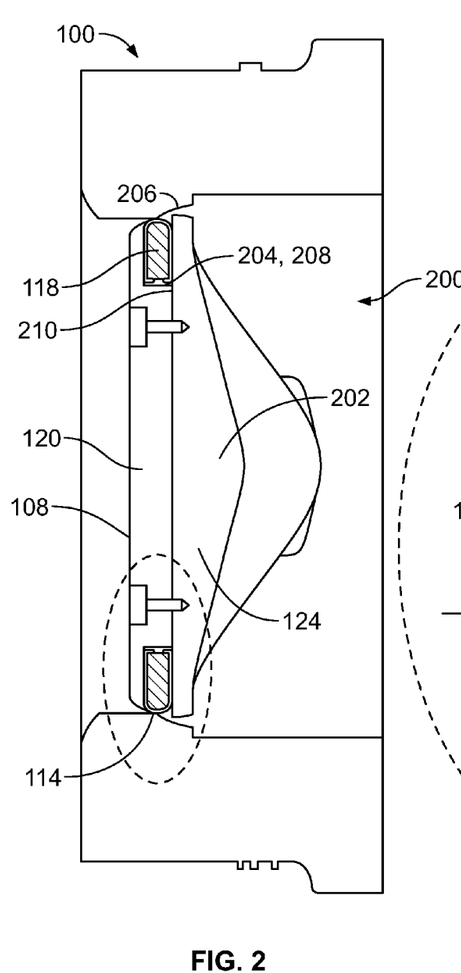
FIG. 2 is a partial cross-sectional view of the example fluid valve shown in FIG. 1.

FIG. 2 is a cross-sectional view of a portion of the example rotary valve 100 of FIG. 1 showing the flow control member 108 in a closed position 200. The flow control member 108 of the illustrated example comprises a butterfly valve disk 202. When the retainer 120 is coupled to the body 124, the retainer 120 and the body 124 define a sealing cavity 204. The sealing cavity 204 of the illustrated example is defined adjacent an outer peripheral edge 206 of the body 124 and/or the retainer 120. More specifically, the sealing cavity 204 defines an annular groove or slot 208 between the retainer 120 and the body 124. As shown in this example, the annular groove 208 is formed or provided on an inner surface 210 of the retainer 120. Additionally or alternatively, in other examples, the annular groove 208 may be positioned on the body 124 of the disk 202.

The seal 118 of the illustrated example is positioned, clamped or otherwise retained within the sealing cavity 204 via the retainer 120. The seal 118 of the illustrated example is an annular ring that at least partially protrudes from the sealing cavity 204 relative to the peripheral edge 206 of the flow control member 108 to sealingly engage the seating surface 114 of the rotary valve 100.

Figure 3:
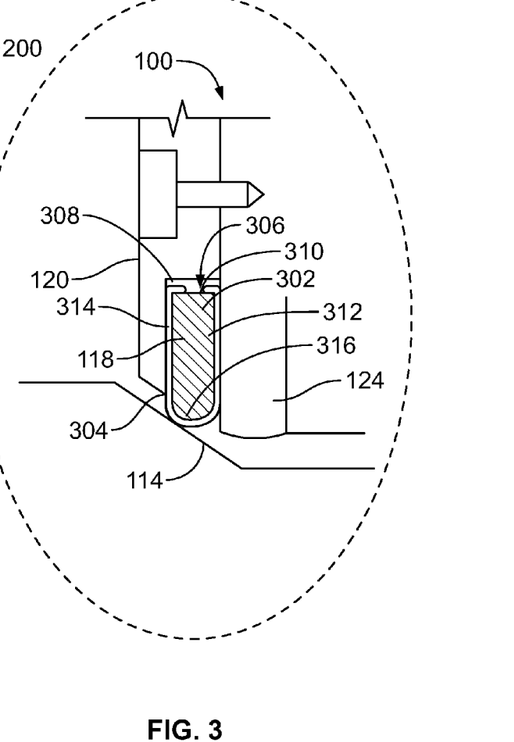
FIG. 3 is an enlarged view of the example fluid valve shown in FIG. 2.

FIG. 3 is an enlarged view of a portion of the rotary valve 100 shown in FIGS. 1 and 2. The seal 118 of the illustrated example includes a first seal portion 302 composed of a first material and a second seal portion 304 composed of a second material different than the first material. The first seal portion 302 is an inner core or layer composed of the first material and the second seal portion 304 is an outer layer composed of the second material. More specifically, the first seal portion 302 of the illustrated example is substantially encased or enclosed by the second seal portion 304. In other words, the second seal portion 304 substantially surrounds a perimeter of the first seal portion 302 such that a gap 306 between ends 308, 310 of the second seal portion 304 is provided to expose a portion of the first seal portion 302. In this manner, the gap 306 of the illustrated example allows the first seal portion 302 to expand, for example, when the flow control member 108 is in the closed position 200 and the seal 118 is sealingly engaged with the seating surface 114. In other examples, the second seal portion 304 may enclose or encase (e.g., completely enclosed) the first seal portion 302 such that the ends 308, 310 of the second seal portion 304 engage or overlap one another such that no portion of the first seal portion 302 is exposed.

The first seal portion 302 of the illustrated example is a core 312 composed of graphite or expanded graphite material having flexible, resilient characteristics. The second seal portion 304 is a thin metal sheet, strip, cover or sheath 314 that conforms to a profile of the core 312. The sheath 314 of the illustrated example is composed of a metallic material and is relatively thin compared to the core 312. The second seal portion of the illustrated example may be composed of stainless steel, an alloy, and/or any other material (e.g., a non-metallic or plastic material) that may be used to improve temperature and erosion resistance of the first seal portion. In particular, the sheath 314 has a thickness that is significantly thinner than a thickness of the core 312 such that the core 312 causes the sheath 314 to conform to seating surface 114 of the rotary valve 100 when the flow control member 108 sealingly engages the seating surface 114. In the illustrated example, the core 312 comprises a curved surface 316 having a radius to conform to a radius of the seating surface 114 of the rotary valve 100. When the seal 118 is in sealing engagement with the seating surface 114, the second seal portion 304 or sheath 314 transfers a load between the seating surface 114 and the first seal portion 302. In operation, the sheath 314 protects the core 312 from damage and/or erosion when the seal 118 is exposed to process fluids having relatively high temperatures and/or pressures or velocities that would otherwise damage and/or erode the core 312 absent the sheath 314.

Figure 4:
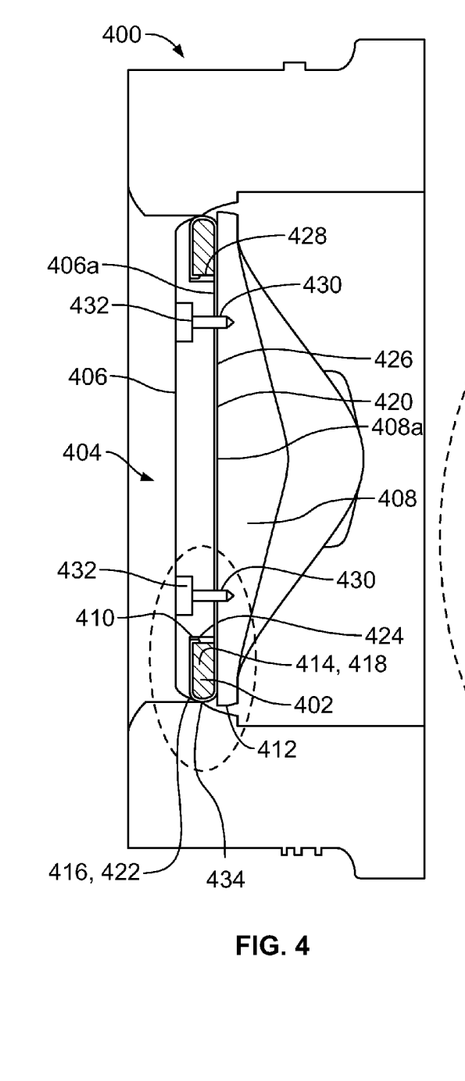
FIG. 4 is a partial cross-sectional view of another example fluid valve constructed in accordance with the teachings disclosed herein.
Figure 5:
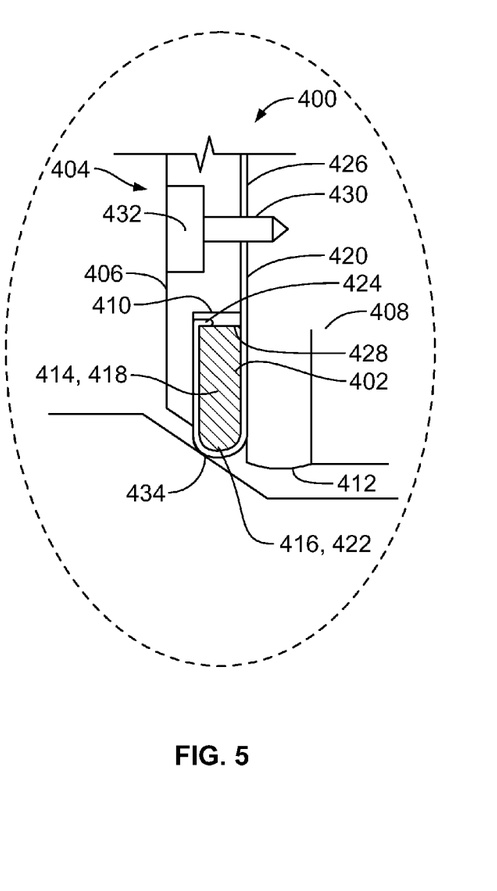
FIG. 5 is a partial cross-sectional view of the example fluid valve of FIG. 4.

FIG. 4 illustrates another example rotary valve 400 disclosed herein. FIG. 5 is an enlarged view of a portion of the example rotary valve 400 of FIG. 4. The example rotary valve 400 is substantially similar to the rotary valve 100 of FIGS. 1-4, but is implemented with another example seal 402 disclosed herein.

The example rotary valve 400 includes a flow control member 404 having a retainer 406 coupled to a body 408 to define a sealing cavity 410 about a peripheral edge 412 of the retainer 406 and/or the body 408. The seal 402 of the illustrated example is positioned or clamped within the sealing cavity 410. The seal 402 includes a first seal portion 414 composed of a first material (e.g., graphite) encased, wrapped or enclosed with a second seal portion 416 composed of a second material (e.g., stainless steel) different than the first material. For example, the first seal portion 414 defines a core or an annular ring 418 and is substantially similar to the first seal portion 302 of the example rotary valve 100 of FIGS. 1-4.

The second seal portion 416 of the illustrated example includes a blowout prevention or locking feature 420. More specifically, the second seal portion 416 defines an annular strip, sheet or sheath 422 (e.g., a unitary strip) that includes an edge 424 (e.g., an outer edge) wrapped, crimped or otherwise formed around at least a portion of the first seal portion 414, and an intermediate portion 426 (e.g., a strip of material or a circular plate) extending across at least a portion of an opening 428 defined by the annular ring 418. For example, the intermediate portion 426 of the second seal portion 416 forms a substantially circular plate to attach or clamp the seal 402 to the flow control member 404. More specifically, the intermediate portion 426 is clamped or captured between a wall or surface 406a of the retainer 406 and a wall or surface 408a the body 408. In some examples, the intermediate portion 426 may include one or more openings 430 to receive a fastener 432 of the retainer 406.

During operation, a temporary suction or vacuum may occur at an interface between the seal 402 and a seating surface 434 when the flow control member 404 is moved to an open position (e.g., moves away from the seating surface 434 of the rotary valve 400) while exposed to high pressure fluids. As a result, there is a risk of the seal 402 being loosened, sucked or pulled out from the sealing cavity 410 by the fluid forces (e.g., a vacuum) overcoming the frictional or clamping forces provided by the retainer 406 and the body 408. In some instances, such blowout can result in the loss of tight shut-off capability, thereby allowing fluid to flow through the rotary valve 400 when the flow control member 404 is in sealing engagement the seating surface 434 of the rotary valve 400.

However, the intermediate portion 426 being clamped between the retainer 406 and the body 408 of the flow control member 404 reduces the risk of the seal 402 becoming loose or dislodged from the sealing cavity 410 of the flow control member 404. Therefore, the intermediate portion 426 of the second seal portion 416 provides a blowout prevention feature by increasing a clamping or holding force provided by the retainer 406 and the body 408 to significantly reduce the likelihood of the seal 402 (e.g., the first seal portion 416) becoming loose or dislodged from the sealing cavity 410 when the rotary valve 400 is moved to an open position while exposed to process fluids having relatively high pressures.

Figure 6:
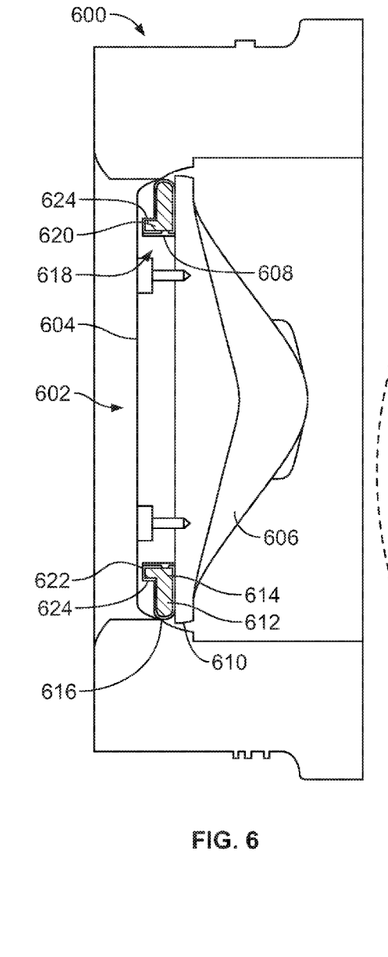
FIG. 6 is a partial cross-sectional view of another example fluid valve constructed in accordance with the teachings disclosed herein.

FIG. 6 illustrates another example rotary valve 600 constructed in accordance with the teachings disclosed herein. The example rotary valve 600 includes a flow control member 602 having a retainer 604 coupled to a body 606 of the flow control member 602 to define a sealing cavity 608 about a peripheral edge 610 of the retainer 604 and/or the body 606. A seal 612 of the illustrated example is positioned or clamped within the sealing cavity 608. The seal 612 includes a first seal portion 614 composed of a first material (e.g., graphite) encased, wrapped or enclosed with a second seal portion 616 composed of a second material (e.g., stainless steel) different than the first material.

Similar to the rotary valve 400 of FIGS. 4 and 5, the example seal 612 of the illustrated example includes a blowout prevention or locking feature 618 to reduce the risk of the seal 612 loosening or becoming dislodged from the sealing cavity 608 of the flow control member 602 when the rotary valve 600 is exposed to high pressure and/or high velocity process fluids. In the illustrated example, both the first and second seal portions 614, 616 define the locking feature 618. The first seal portion 614 defines a core having annular ring-shaped profile. The first seal portion 614 also defines a protruding shoulder, lip or leg 620 to help retain the seal 612 within the sealing cavity 608 of the flow control member 602. In particular, the first seal portion 614 defines an L-shaped cross-sectional profile. The second seal portion 616 (e.g., a relatively thin strip of material composed of metal) wraps around the shoulder portion 620 of the first seal portion 614.

The retainer 604 of the illustrated example includes a groove, slot or channel 622 to receive the shoulder 620 of the first seal portion 614 when the retainer 604 is coupled to the body 606. As a result, the shoulder 620 of the first seal portion 614 engages a shoulder or wall 624 defined by the channel 622 to help retain or maintain the seal 612 in the sealing cavity 608 during operation of the rotary valve 600. In other examples, the body 606 may include a groove or channel instead of the retainer 604 to receive the shoulder 620 of the first seal portion 614. In yet other examples, the seal 612 may include another shoulder or leg (e.g., opposite and similar to the shoulder 620) such that both the channel 622 in the retainer 604 and a channel in the body 606 receive respective shoulders of the seal 612 to help retain the seal 612 in the sealing cavity 608 (e.g., a T-shaped seal).

Figure 7:
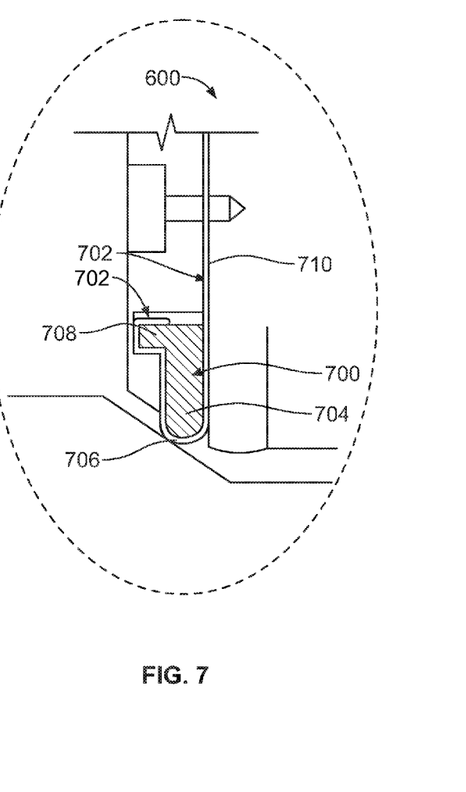
FIG. 7 is a partial cross-sectional, enlarged view of the example fluid valve of FIG. 6, but implemented with another example seal disclosed herein.

FIG. 7 is an enlarged view of a portion of the example rotary valve 600 of FIG. 6, but implemented with another example seal 700. The example seal 700 of FIG. 7 includes a blowout prevention or locking feature 702 that is a combination of the locking feature 420 of FIGS. 4 and 5 and the locking feature 618 of FIG. 6. More specifically, the seal 700 includes a first seal portion 704 that is encased with a second seal portion 706. The first seal portion 704 includes a lip or shoulder 708 similar to the shoulder 620 of the seal 612 shown in FIG. 6 and the second seal portion 706 includes an intermediate portion 710 similar to the intermediate portion 426 of the example seal 402 of FIGS. 4 and 5.

Figure 8:
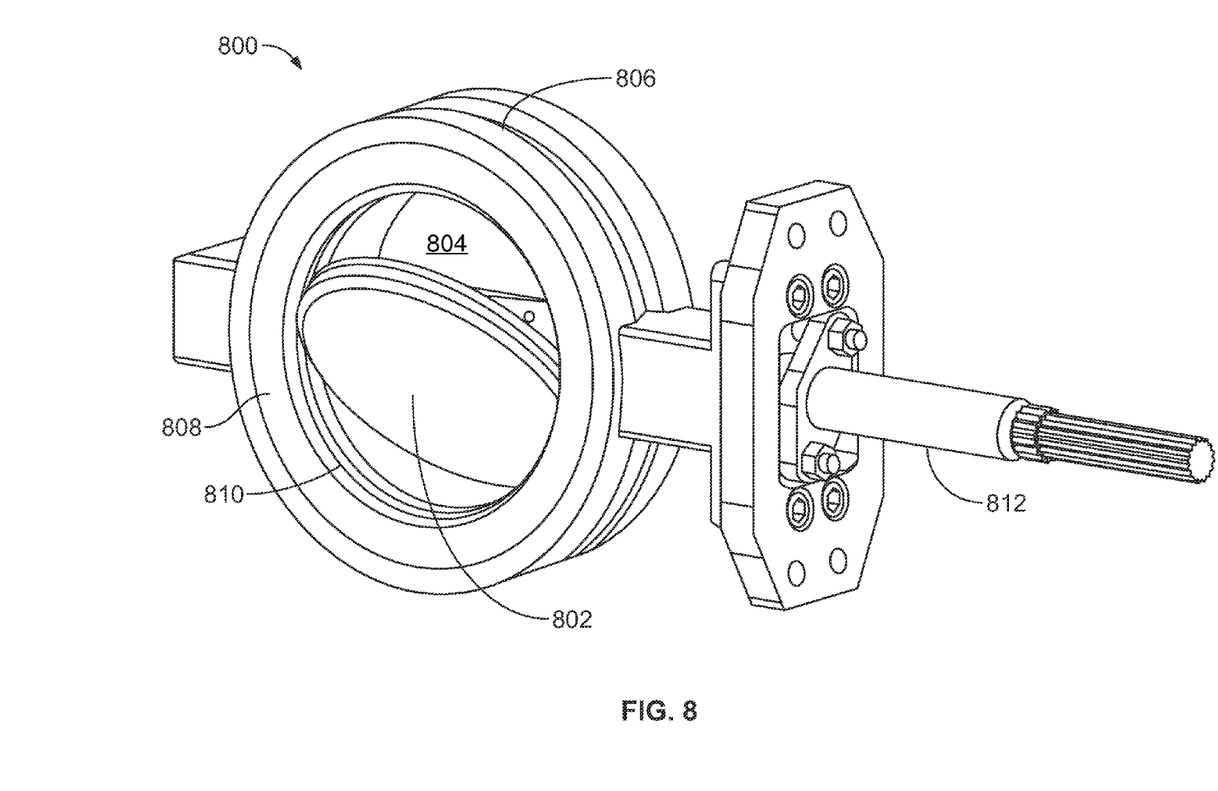
FIG. 8 illustrates another example fluid valve constructed in accordance with the teachings disclosed herein.

FIG. 8 illustrates another example rotary valve 800 disclosed herein. As shown in FIG. 8, the rotary valve 800 includes a movable flow control member 802 (e.g., a movable disk) positioned within a passageway 804 defined by a valve body 806 of the rotary valve 800 at which a relatively high pressure fluid may be presented. The rotary valve 800 includes a retainer ring 808 coupled to the valve body 806 to retain a seal ring assembly 810 within the valve body 806.

To control the flow of process fluid through the passageway 804, the flow control member 802 is operatively coupled to an actuator (not shown)(e.g., a manual actuator, a pneumatic actuator, etc.) via a valve shaft 812. For example, the actuator moves the flow control member 802 relative to the seal ring assembly 810 in response to a control signal from a process controller, which may be part of a distributed control system (neither of which are shown). During operation, the actuator moves or rotates the flow control member 802 relative to the seal ring assembly 810 between a closed position to prevent fluid flow through the passageway 804 and an open position to allow fluid flow through the passageway 804.

Figure 9:
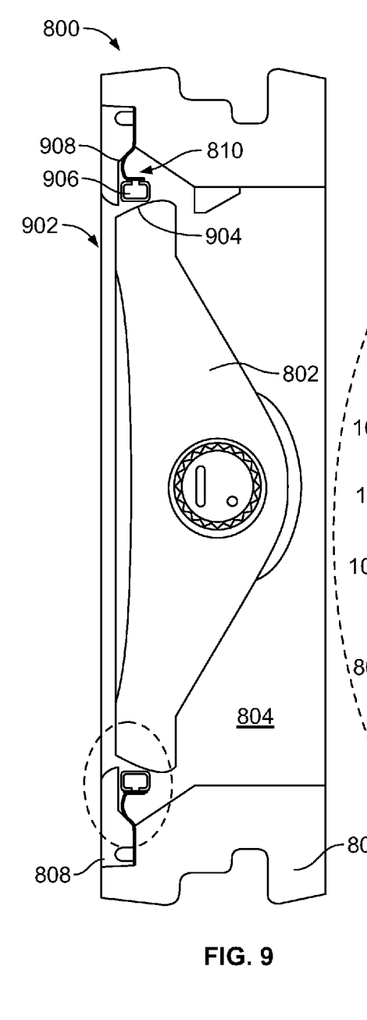
FIG. 9 is a partial cross-sectional view of the example fluid valve of FIG. 8 shown in a closed position.

FIG. 9 is a cross-sectional view of a portion of the example rotary valve 800 of FIG. 8 shown in a closed position 902. In the closed position 902, a sealing edge 904 (e.g., a peripheral edge) of the flow control member 802 sealingly engages the seal ring assembly 810 to prevent or restrict fluid flow through the passageway 804. The seal ring assembly 810 of the illustrated example includes a seal 906 coupled to a carrier 908. The carrier 908 may be composed of metal (e.g., stainless steel) and provides a spring or biasing effect to the seal 906. In the illustrated example, a portion of the carrier 908 is positioned or clamped between the retainer 808 and the valve body 806 and couples the seal 906 to the valve body 806.

As the flow control member 802 moves or rotates to the closed position 902, the sealing edge 904 of the flow control member 802 engages or slides against the seal 906 and into the closed position 902. The carrier 908 allows the seal 906 to compress or deflect as the flow control member 802 is rotated into the closed position 902 and the carrier 908 biases the seal 906 radially inward (e.g., toward a center of the valve body 806) and against the sealing edge 904 of the flow control member 802 to create a sufficiently tight seal between the seal 906 and the sealing edge 904. Additionally, the example seal 906 and the carrier 908 provide a pressure-assisted seal. In particular, a pressure differential across the flow control member 802 provided by an inlet pressure that is greater than an outlet pressure provides an unbalanced force at an inlet side of the carrier 908 and the seal 906 that helps assist or bias (e.g., push) the seal 906 against the sealing edge 904.

Figure 10:
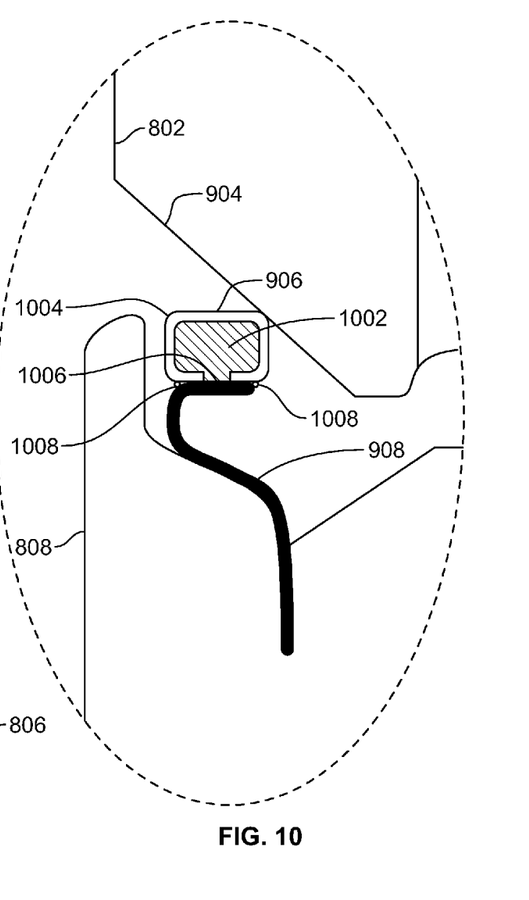
FIG. 10 is a partial, enlarged view of the fluid valve of FIGS. 8 and 9.

FIG. 10 illustrates an enlarged portion of the example rotary valve 800 of FIGS. 8 and 9. The seal 906 of the illustrated example includes a first seal portion 1002 composed of a first material and a second seal portion 1004 composed of a second material different than the first material. For example, the first seal portion 1002 is an inner core composed of graphite material and the second seal portion 1004 is an outer layer or protective sheath composed of metal (e.g., stainless steel, a nickel based alloy, etc.). More specifically, the first seal portion 1002 of the illustrated example is substantially encased or enclosed by the second seal portion 1004. Further, the second seal portion 1004 is relatively thin compared to a thickness of the first seal portion 1002. The seal 906 of the illustrated example is substantially similar to the seal 118 disclosed in connection with FIGS. 1-4 and the structure and function is substantially similar to the structure and function of the example seal 118. For example, in operation, the second seal portion 1004 protects the first seal portion 1002 from damage and/or erosion when the seal 906 is exposed to process fluids having relatively high temperatures and/or pressures or velocities that would otherwise damage and/or erode the first seal portion 1002 absent the second seal portion 1004. As shown in the illustrated example, the seal 906 is attached to an end 1006 of the carrier 908 via a weld 1008. However, in other examples, the seal 906 may be coupled to the carrier 908 via a mechanical fastener, a chemical fastener such as adhesive, and/or any other suitable fastener(s) or method(s).

Figure 11:
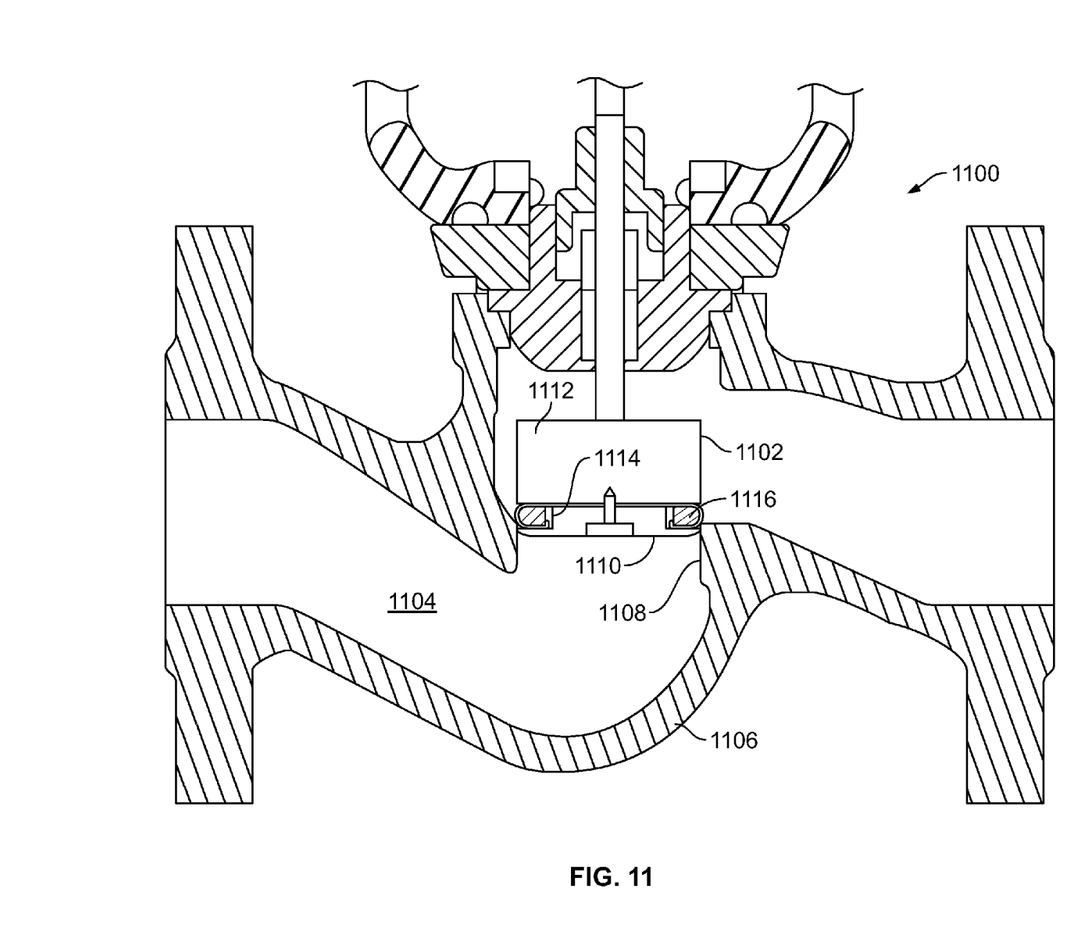
FIG. 11 illustrates another fluid valve constructed in accordance with the teachings disclosed herein.

The example seals disclosed herein are not limited to rotary valves. In some examples, the seals disclosed herein may be employed with linear valves such as sliding stem valves. For example, FIG. 11 illustrates a linear valve 1100 that may be configured with any one of the example seals 118, 402, 612 and 700 disclosed herein. The linear valve 1100 includes a valve plug 1102 positioned within a fluid flow passageway 1104 of a valve body 1106 and moves relative to a valve seat 1108 to control the flow of fluid through the passageway 1104. The valve plug 1102 of the illustrated example includes a retainer 1110 coupled to a plug body 1112. The retainer 1110 and the plug body 1112 define a sealing cavity 1114 to receive a seal 1116. For example, the seal 1116 of the illustrated example is substantially similar to the seal 402 of FIGS. 4 and 5. The retainer 1110 clamps or otherwise couples the seal 1116 to the plug body 1112. In other examples, the retainer 1110 and/or the plug body 1112 may be configured to receive any one of the example seals 118, 612 and 700 disclosed herein.

Figure 12A:
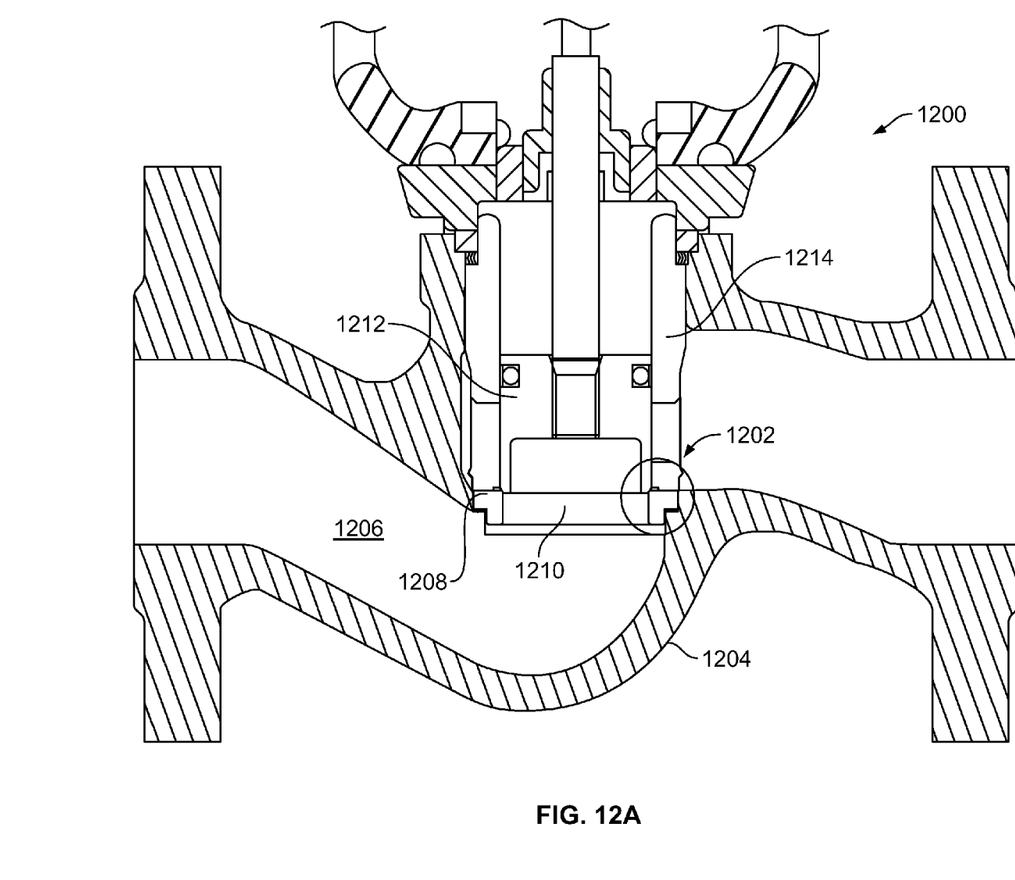
FIGS. 12A and 12B illustrate another fluid valve constructed in accordance with the teachings disclosed herein.
Figure 12B:
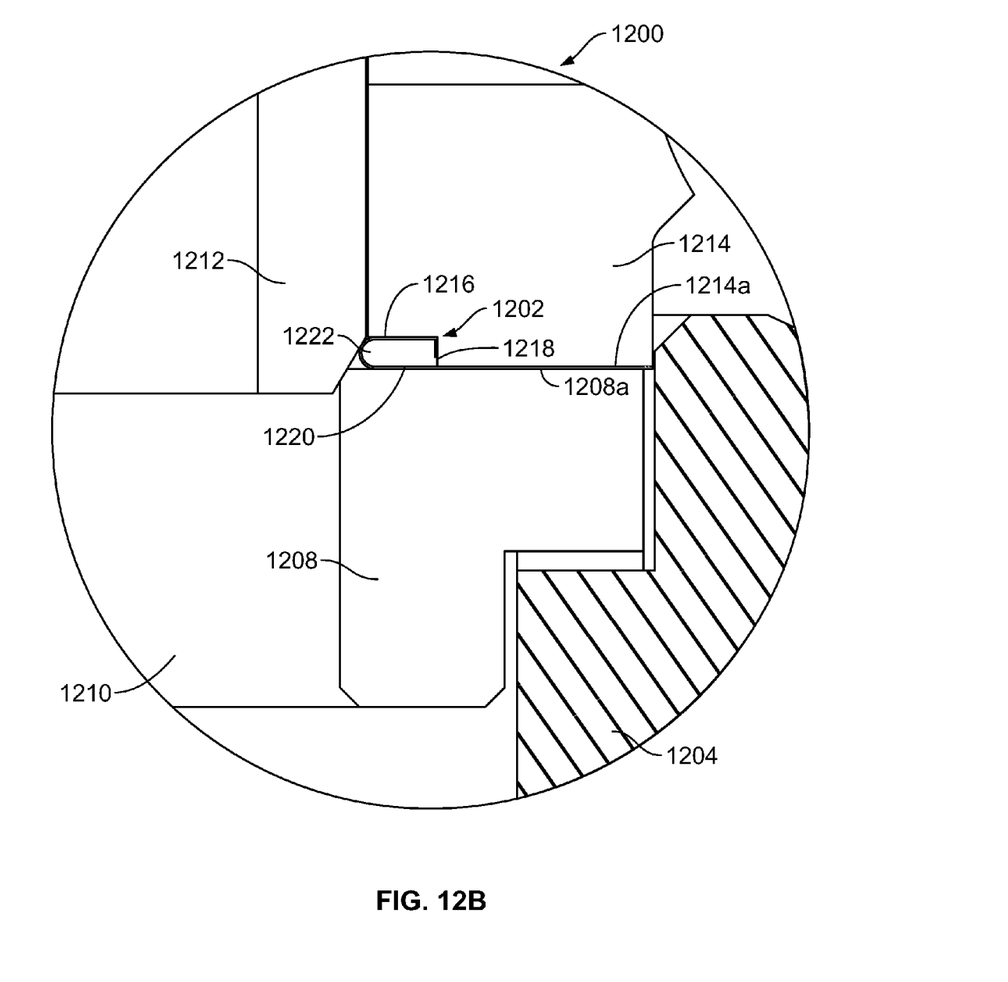

FIGS. 12A and 12B illustrate another example linear valve 1200 that may be configured with an example seal 1202 disclosed herein. In the illustrated example, the linear valve 1200 includes a valve body 1204 defining a fluid flow passageway 1206. A seat ring 1208 is positioned within the passageway 1206 and includes an opening 1210 defining an orifice of the passageway 1206. A flow control member 1212 moves within a retainer or cage 1214 and relative to the seat ring 1208 to control fluid flow through the valve 1200. Referring to FIG. 12B, the cage 1214 is engaged with or coupled to the seat ring 1208 to retain the seat ring 1208 in the valve body 1204. In the illustrated example, the cage 1214 includes a recessed portion 1216 (e.g., a notched portion adjacent an end of the cage 1214) to define a sealing cavity 1218 to receive the seal 1202. Thus, the cage 1214 clamps or otherwise holds the seal 1202 against the seat ring 1208. The seal 1202 of the illustrated example includes a first portion or sheath 1220 substantially surrounding a second portion or core 1222 and is captured between respective clamping surfaces 1214a, 1208a of the cage 1214 and the seat ring 1208 to help retain the seal 1202 in the sealing cavity 1218. In other examples, the cage 1214 and/or the seat ring 1208 may be configured to receive any one of the example seals 118, 612 and 700 disclosed herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A fluid valve comprising:
    a movable flow control member positioned between an inlet and an outlet of a fluid flow passageway of the fluid valve;
    a retainer removably coupled to a body of the flow control member, the retainer and the flow control member to define a sealing cavity when the retainer is coupled to the flow control member; and
    a seal positioned within the sealing cavity to define a sealing surface of the flow control member, the seal having an inner core composed of a first material and an outer sheath composed of a second material different than the first material, the retainer to clamp the seal to the flow control member, the outer sheath having a first portion and a second portion extending from the first portion, the first portion to house the inner core and the second portion to be clamped between the retainer and the flow control member, a first surface of the second portion is to engage the retainer and a second surface of the second portion opposite the first surface is to engage the flow control member when the second portion of the outer sheath is clamped between the retainer and the flow control member.

2. The valve of claim 1, wherein the movable flow control member comprises a butterfly valve disk.

3. The valve of claim 1, wherein the movable flow control member comprises a plug.

4. The valve of claim 1, wherein the seal comprises an annular ring that at least partially protrudes from the sealing cavity of the flow control member, the seal to engage a seat of the fluid valve.

5. The valve of claim 1, wherein the sheath is thinner than the inner core such that the inner core causes the sheath to conform to a valve seat of the fluid valve when the flow control member sealingly engages the valve seat.

6. The valve of claim 5, wherein the inner core comprises graphite material and the sheath comprises a metallic material.

7. The valve of claim 1, wherein the inner core comprises a curved surface defining a sealing surface of the seal, the curved surface having a radius to conform to a radius of a seat of the fluid valve.

8. The valve of claim 1, further comprising a blowout prevention feature to retain the seal between the retainer and the flow control member.

9. The valve of claim 8, wherein the blowout prevention feature includes a protruding shoulder or lip to help retain the seal within the sealing cavity of the flow control member.

10. The valve of claim 9, wherein the retainer includes a channel to receive the shoulder or the lip of the blowout prevention feature.

11. The valve of claim 1, wherein the second portion of the outer sheath includes a strip of material extending from the first portion and adjacent at least a portion of an aperture formed by the inner core.

12. The valve of claim 11, wherein a fastener of the retainer is received by the flow control member and the strip of material.

13. The valve of claim 1, wherein the sealing surface is provided about a peripheral edge of the flow control member.

14. The valve of claim 1, wherein the sheath forms a gap between respective ends of the sheath to expose a portion of the core and enable the core to expand.

15. The valve of claim 1, wherein the second portion of the outer sheath forms a substantially circular plate.

16. The valve of claim 1, wherein the second portion of the outer sheath is clamped between a surface of the retainer and a surface of the flow control member.

17. The valve of claim 1, wherein the second portion of the outer sheath includes an opening to receive a fastener of the retainer.

18. A valve comprising:
    a flow control member positioned within a fluid valve, the flow control member having a seal assembly to define a sealing surface about a peripheral edge of the flow control member, the seal assembly having:
        a first seal portion composed of an expanded graphite material; and
        a second seal portion composed of a metallic material, the second seal portion having an end to substantially encase the first seal portion and an intermediate portion to extend away from the end such that the intermediate portion is spaced from the first seal portion, the second seal portion having a first side opposite a second side; and
    a retainer to retain the seal assembly about the peripheral edge of the flow control member, the first side of the seal assembly to engage the flow control member and the second side of the seal assembly to engage the retainer when the retainer is coupled to the flow control member.

19. The valve of claim 18, wherein the second seal portion comprises a sheet of material that conforms to a profile of the first seal portion.

20. The valve of claim 18, wherein the second seal portion transfers a load between a valve seat and the first seal portion when the seal assembly is in sealing engagement with the valve seat.

21. The valve of claim 18, wherein the seal assembly is at least partially enclosed within a groove adjacent the peripheral edge of the flow control member.

22. The valve of claim 18, wherein the first seal portion comprises an annular ring, the intermediate portion to extend adjacent at least a portion of an opening of the annular ring, the intermediate portion to clamp to the flow control member via the retainer.

23. The valve of claim 18, wherein the second seal portion is sufficiently thin relative to the first seal portion, the second seal portion to resiliently deform against a seat of the fluid valve.

24. A fluid valve comprising:
    a flow control member positioned between an inlet and an outlet of a fluid flow passageway of the fluid valve;
    a retainer removably coupled to a body of the flow control member, the retainer and the flow control member to define a sealing cavity when the retainer is coupled to the flow control member; and
    a seal positioned within the sealing cavity to define a sealing surface of the flow control member, the seal having an annular ring composed of a first material and an outer sheath composed of a second material different than the first material, the outer sheath having a first portion and a second portion extending from the first portion, the first portion to house the annular ring and the second portion to extend across at least a portion of an opening defined by the annular ring, the second portion to engage a surface of the retainer and a surface of the flow control member.

25. The valve of claim 24, wherein the second portion forms a substantially circular plate to be positioned between the retainer and the flow control member.

26. The valve of claim 24, wherein the second portion of the seal includes a first side and a second side opposite the first side, the first side is to engage the flow control member and the second side is to engage the retainer when the retainer is coupled to the flow control member.

* * * * *